United States Patent [19]

Hasbrouck

[11] 3,946,306

[45] Mar. 23, 1976

[54] IGNITION COIL AND CAPACITOR ANALYZER UTILIZING THE ZERO CROSS OVERS AND PEAK VOLTAGE OF THE LOW COIL RINGING VOLTAGE

[75] Inventor: Larkin M. Hasbrouck, Norfolk, Conn.

[73] Assignee: United Technologies Corporation, Hartford, Conn.

[22] Filed: Dec. 19, 1974

[21] Appl. No.: 534,524

[52] U.S. Cl. .................................................. 324/16 R
[51] Int. Cl.$^2$ .......................................... G01M 15/00
[58] Field of Search ..................................... 324/15–19

[56] References Cited

UNITED STATES PATENTS

| | | | |
|---|---|---|---|
| 3,551,800 | 12/1970 | Widmer | 324/15 |
| 3,714,554 | 1/1973 | Benedix | 324/16 R |
| 3,771,047 | 11/1973 | Spengler et al. | 324/16 R |
| 3,793,584 | 2/1974 | Liebermann et al. | 324/16 R |

*Primary Examiner*—Robert J. Corcoran
*Attorney, Agent, or Firm*—M. P. Williams

[57] ABSTRACT

The condition of the ignition coil and capacitor of an internal combustion engine are analyzed by determining the number of zero cross-overs in the ringing of the low coil voltage as well as whether or not the low coil voltage exceeds a threshold magnitude, during the spark period of a disconnected spark plug while the engine is running. In one disclosed embodiment, the cross-overs in the low coil ringing voltage and the times that the threshold is exceeded are counted over a moderate number (such as 16) of revolutions of the distributor, and then the average number of ringing cross-overs is combined with the approximate percent of time that the threshold voltage is exceeded during that number of revolutions to present signals indicating that the ignition is normal, the coil has shorted turns or intermittent arc-overs, or that the capacitor is open. In another disclosed embodiment the cross-overs are quantized in a monostable multivibrator and integrator, to provide analog indications of the number of cross-overs to permit transference thereof through an analog multiplexer and analog to digital converter to a digital processor for analysis in a desired fashion.

8 Claims, 3 Drawing Figures

IGN SWX
SIG COND
SQ AMP
RETRIG MONO
EN
THRESH
READ
RESET
4 BIT CTR 1 2 3 4
R
÷16
A
O
I
V
0-3
4-10
0%
25°-75°
75°-100°
SHORTED TURNS
OPEN CAPAC.
INTR'T ARC
NORMAL

IGNITION COIL AND CAPACITOR ANALYZER UTILIZING THE ZERO CROSS OVERS AND PEAK VOLTAGE OF THE LOW COIL RINGING VOLTAGE

CROSS REFERENCE TO RELATED APPLICATIONS

The subject matter hereof is also disclosed, and some of it is claimed, in a commonly owned copending application entitled IGNITION ANALYSIS, Ser. No. 534,337 filed on even date herewith by Anthony J. Fastaia and Larkin M. Hasbrouck.

BACKGROUND OF THE INVENTION

1. Field of Invention

This invention relates to vehicle diagnostics, and more particularly to apparatus for the analysis of coil and capacitor conditions in the ignition system of an internal combustion engine.

2. Description of the Prior Art

It has been common for the diagnostic analysis of the electric ignition system of internal combustion engines to be performed primarily in dependence upon an operator's interpretation of a waveform of the low coil voltage, as displayed upon an oscilloscope. This is due in part to the fact that it is relatively costly and time consuming to analyze the condition of the individual components of the ignition system. For instance, although it is easy to determine when the breaker point capacitor is shorted, it has heretofore been difficult to determine the likelihood of the capacitor being open. Similarly, although an open coil is reasonably easy to diagnose, short circuiting of some of the turns of the coil and intermittent arc-overs of the coil have heretofore been difficult to determine. One problem with the graphic analysis of the spark characteristics is that it is highly dependent upon the interpretive skill of the operator. Further, subtle variations from a normal pattern, such as those that result from intermittent arcs or a few shorted turns of the coil, are difficult to observe. In addition, the cathode ray tube circuitry required for a presentation of the spark is rather delicate in contrast with the harsh environment in which vehicle diagnostics are normally performed.

SUMMARY OF INVENTION

The principle object of the present invention is provision of improved analysis of the condition of ignition coils and capacitors.

According to the present invention, the low coil ringing voltage is squared-up in a hard driven amplifier, quantized in a monostable multivibrator and accumulated in an integrator so as to provide an analog voltage indication of the number of cross-overs, and a voltage divider connected to low coil voltage operates a threshold detector to provide an indication of whether or not the peak magnitude of the lower coil voltage exceeds a reference, threshold magnitude.

According further to the present invention the quantizing monostable multivibrator is enabled by a retriggerable monostable multivibrator in a manner to prevent noise in the initial portion of the low coil ringing voltage from falsely triggering quantizing monostable multivibrator, thereby rendering the system extremely insensitive to noise, without any need to know the number of cross-overs to be quantized and the commensurate time for the quantizing multivibrator to be enabled.

The present invention provides signals permitting a substantially noise-independent, automatic analysis of the coil and capacitor in an internal combustion engine ignition system, which eliminates the need for operator interpretation and generates discrete manifestations indicating probable conditions in the coil and capacitor of the ignition system. The invention is readily implemented in a variety of forms utilizing components and technology which are widely available in the art.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
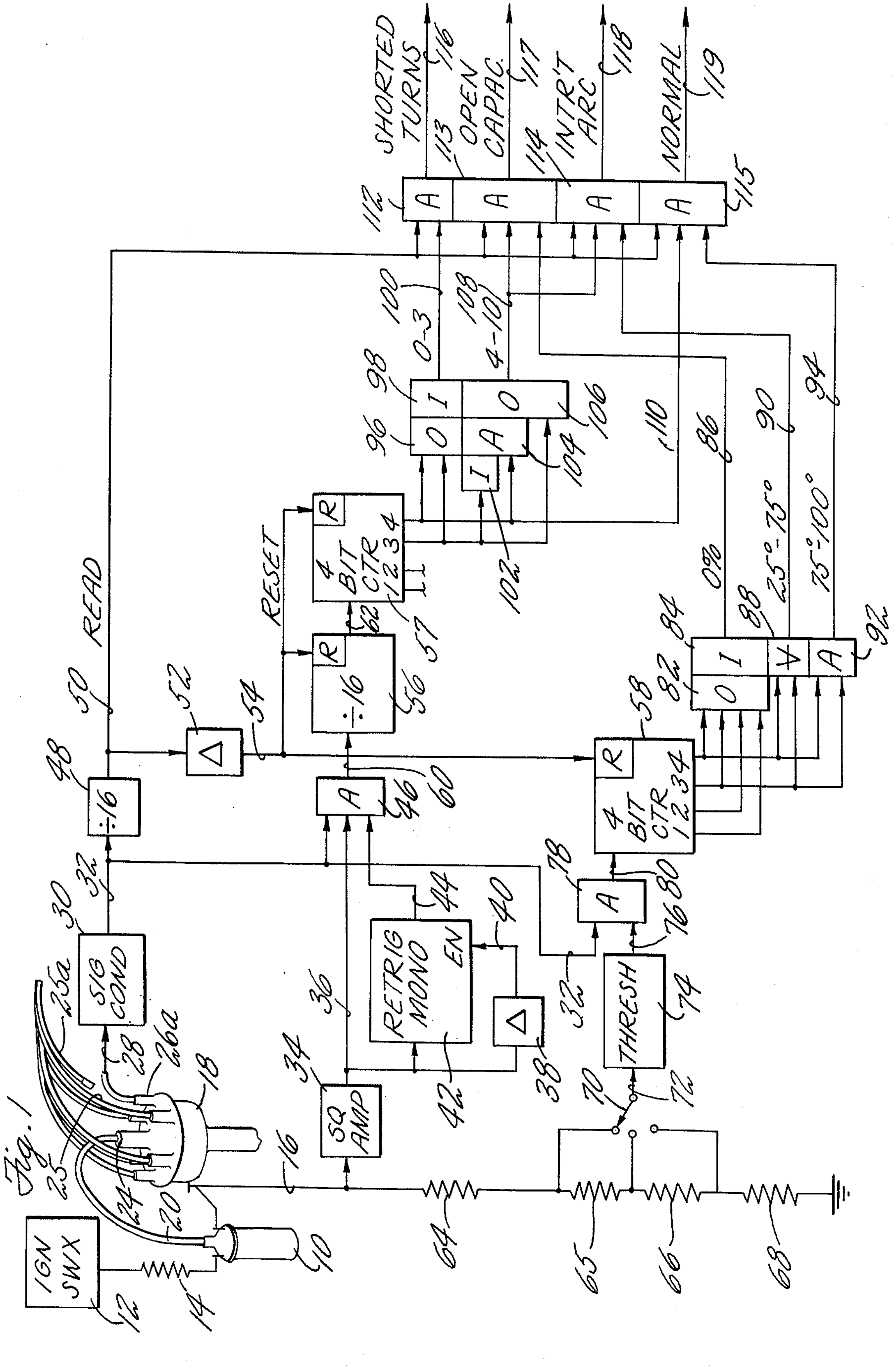
FIG. 1 is a schematic block diagram of an exemplary embodiment of the present invention.

Referring now to FIG. 1, a coil 10 of an automotive ignition system is energized from an engine ignition switch 12 through a resistor 14, the low side of the coil 10 being connected by a wire 16 to the breaker points within a distributor 18 of a type well known in the art. The high voltage output of the coil 10 is applied by a high voltage lead 20 to the distributor high voltage input 24 for distribution to plug wires 25 by respective high voltage terminals 26 in dependence upon the position of the rotor within the distributor 18, as is well known. In the present embodiment, the condition of the ignition system is tested with the engine running, but the voltage conditions are taken at one particular high voltage terminal 26*a* of the distributor 18 for which the related spark plug wire 25*a* has been disconnected. Connection to the terminal 26*a* also provides a signal on a line 28 which, after suitable filtering, stretching and the like in a signal conditioning circuit 30, provides a timing signal of suitable duration on the line 32 indicative of the fact that the rotor is connected to the terminal 26*a*, and that therefore a low coil voltage on the line 16 is indicative of a high voltage pulse on the line 20 which will not be applied to a spark plug, so that the voltage on the line 16 may be analyzed in accordance with the present invention. Voltage on the line 16 (see illustration (*a*) of FIG. 3) is applied to a high gain, hard-limited amplifier 34 so as to provide a square wave manifestation of the low coil ringing voltage (illustration (*b*) of FIG. 3) on a line 36 in which the positive and negative swings of the square wave are aligned in time with the zero cross-overs of the ringing low coil voltage. Thus, counting of the cross-overs on the line 36 provides an accurate indication of the number of cross-overs in the ringing low coil voltage. The signal on the line 36 is supplied through a delay circuit 38 to an enabling input 40 of a retriggerable monostable multivibrator 42. The retriggerable monostable multivibrator 42 may comprise one-half of an Ser. No. 74123, or any other suitable circuit known and available in the art. The enabling input may comprise an overriding clear input, which holds the monostable multivibrator in the reset condition until the signal level on the line 40 changes, after which the monostable multivibrator can be triggered and retriggered in the well known fashion. The combination of the delay circuit 38 and the retriggerable monostable multivibrator 42 provide a gating signal on a line 44 which blocks an AND circuit 46 for the period of the delay unit 38 immediately following the first cross-over-indicating transition on the line 36. However, once the retriggerable monostable multivibrator 42 operates, successive transitions on the line 36 hold the multivibrator 42 in the operated condition until such time as it times out without being retriggered, as is shown in illustration (*c*) of FIG. 3. In a typical automotive system, the delay unit 38 may provide a delay on the order of 80 microseconds, since it is during this period of the low coil ringing voltage that is most noisy. Although signals appear on the lines 36, 44 in response to low coil voltage on the line 16 for each firing of every spark plug, the AND circuit 46 is gated with the conditioned voltage of the selected terminal 26*a* of the distributor so that the square waves on the line 36 will pass therethrough only during that one of the low coil ringing waveforms which relate to the rotor being positioned at the terminal 26*a* indicating that it is a waveform to which none of the spark plugs are connected.

In the embodiment illustrated in FIG. 1, the low coil ringing waveform is analyzed for sixteen full revolutions of the distributor 18, which equals thirty-two revolutions of the engine, each sensing of the selected terminal 26*a*, as indicated by the signal on the line 32, advancing a four bit counter 48 which acts as a divide-by-16 circuit so as to provide a signal on a line 50 once for each sixteen revolutions of the distributor 18. The signal on the line 50 supplied to a delay unit 52 (which may be a monostable multivibrator or other suitable circuit) so as to provide a slight delay in the generation of a reset signal on a line 54. This is used to reset three different four-bit binary counters 56–58, which are utilized to count cross-overs and threshold exceedances. The AND circuit 46 provides signals on a line 60 to advance the counter 56, which acts as a divide-by-sixteen counter, and in turn provides one signal on a line 62 for every sixteen cross-overs of the low coil ringing waveform during the sixteen revolutions of the distributor 18 (32 engine revolutions). For instance, if the coil is providing eight suitable cross-overs at each firing, eight of them will be counted in one revolution of the distributor without issuing any signal on the line 62, and following a second revolution of the distributor 18, eight more will have completed the count of sixteen and provided one signal on the line 62; in such case, there will be eight signals on the line 62 during the full set of sixteen revolutions of the distributor 18. The signals on the line 62 advance a four bit counter 57 which provides an indication of the average number of cross-overs during sixteen revolutions of the distributor 18. In other words, the count in the counter 57 is an indication of the average number of cross-overs per distributor resolution during sixteen distributor revolutions.

The low coil voltage signal on the line 16 is also provided to a voltage divider consisting of a plurality of resistors 64–68 which will connect the peak low coil voltage (which should be on the order of 250 to 350 volts) to a voltage level suitable for transistor circuits, such as less than 10 volts. This may be achieved by causing the resistor 64 to be on the order of 150K Ohms, with the resistor 68 on the order of 3K Ohms and the resistor 65, 66 on the order of 500 Ohms each. The particular threshold voltage is selectable by the positioning of a switch 70 so as to take the voltage from a desired tap of the voltage divider 64–68. This allows changing the threshold in dependence on the particular vehicle being diagnosed, in accordance with the specifications for that vehicle, if desired. Alternatively, a variable adjustment may be provided, or other suitable accommodation of the difference in vehicles may be made. The pole of the switch 70 is connected by a line 72 to a threshold detector 74 which will provide an output signal on a line 76 provided the input thereto is in excess of a desired magnitude. The signal on the line 76 is passed through an AND circuit 78 provided the signal is also present on the line 32 indicating that the distributor is rotated toward the terminal 26*a;* this in turn provides a signal on the line 80 to the four-bit counter 58 so as to register the occurrence of one excess of the threshold voltage; in sixteen revolutions of the ignition 18, the peak voltage of the low coil ringing waveform may exceed the threshold any number of times between zero and sixteen.

At the end of sixteen revolutions of the distributor 18, the setting of the four-bit counter 58 is analyzed by logic circuitry including an OR circuit 82 which will sense the presence of any ONE, in the four-bit counter, and, by virtue of an inverter 84, will generate a signal on a line 86 whenever the four bit counter remains at a setting of zero, thus providing a signal indicative of the fact that the peak voltage exceeded the threshold voltage 0% of the time. The logic circuitry also includes an exclusive OR circuit 88 which provides a signal on a line 90 whenever either the highest order or next highest order bit of the counter 58 is a ONE, but not both of the bits are ONES, thus providing a signal on the line 90 indicative of the fact that a count of between four and twelve has been established in the counter 58, which is equivalent to the threshold being exceeded 25% – 75% of the time during the previous sixteen revolutions of the distributor 18. The logic circuitry also includes an AND circuit 92 which is responsive to concurrent presence of ONEs in the two high order positions of the counter 58 to provide a signal on a line 94 indicating that the threshold was exceeded at least 75% of the time and perhaps as much as 100% of the time.

After sixteen revolutions of the distributor 18, the four-bit counter 57 provides a count indicating the average number of cross-overs of the low coil ringing voltage during such sixteen revolutions. This output is analyzed by logic circuitry including an OR circuit in combination with an inverter 98 to provide a signal on a line 100 whenever less than a count of four has been established. Similarly, logic circuits including an inverter 102 and an AND circuit 104 respond to counts between eight and eleven, and an OR circuit 106 responsive thereto and to the four-bit of the counter 57 therefore provides on a line 108 a signal indicating that the count is between four and ten. The highest ordered bit on a line 110 indicates that a count of between eight and fifteen has been registered. Thus, the lines 100, 108 and 110 provide, respectively, indications that the average number of cross-overs over 16 revolutions of the distributor (32 engine revolutions) is between zero and three, four and ten, or eight and fifteen, respectively.

The cross-over count and threshold percentage signals, acquired during 32 engine revolutions, are combined in gated AND circuits 112–115 to provide indications of the condition of the coil and the capacitor, in response to the presence of a read signal on the line 50, which occurs only at the end of sixteen revolutions of the distributor (32 engine revolutions). The AND circuit 112 provides a signal on a line 116 indicating that there are shorted turns in the coil in response to a count of zero to three as indicated by the signal on the line 100. This may be indicative of a few turns of coil primary being short circuited or a larger number (such as more than 10) of coil secondary turns being short circuited. The AND circuit 113 responds to a count of four to eleven on the line as indicated by the signal on the line 108 and the fact that the threshold voltage was never exceeded in all sixteen revolutions of the distributor 18 so as to provide a signal on a line 117 indicative of an open capacitor. The AND circuit 114 responds to a count of four to ten as indicated by the signal on a line 108 together with the peak voltage exceeding the threshold on the order of 25% to 75% of the time as indicated by the signal on the line 90 to generate a signal on the line 118 indicating that intermittent arcing of the coil is occurring. And, the AND circuit 115 responds to a cross-over count of eight through fifteen as indicated by a signal on the line 110 in combination with the peak voltage of the low coil ringing waveform exceeding the threshold between 75% and 100% of the time as indicated by the signal on the line 94, to generate a signal on the line 119 indicating that the coil and the capacitor are operating in a normal fashion, and therefore may be presumed to be in proper condition.

The particular numbers utilized in FIG. 1 are illustrative merely, but are indicative of numbers which may be found suitable in the general case. Certainly, the percentages and/or the numbers of counts may be varied slightly to suit different vehicles or to accommodate different diagnostic interpretation levels, as may be desired. The particular matrix of events utilized to provide the four indicated results on the lines 116–119 are empirical and based upon the known operation of the apparatus being tested. For instance, an open capacitor cannot be detected without knowing that the voltage is always too low, and that some cross-overs occur; low voltage (such as no voltage at all) without some cross-overs can also be an indication of a shorted capacitor or an open coil, shorted points, etc. On the other hand, some low number of cross-overs with some number of threshold exceedances are indicative of normal operation, but during less than all of the time. And, a good number of cross-overs together with the voltage being adequate most of the time is an indication of normal operation of the coil and the capacitor.

The embodiment of FIG. 1 is an example of hard-wired, dedicated hardware which can perform the analysis of a coil and capacitor in an ignition system in accordance herewith. however, such analysis may also be provided, as is readily apparent, by means of other suitable apparatus, such as dedicated analog hardware and/or digital processors, such as minicomputers or the like. In fact, the invention is preferably incorporated in a comprehensive vehicle diagnostic system in which a large number of engine parameters may be analyzed. In such a system, the performance of the signal analysis attendant the present invention may most efficiently be performed by a digital processor 124, (FIG. 2) for recording and/or display on suitable means 125. The digital processor 124 receives a plurality of digital signals over a trunk of lines 126 from an analog to digital converter 128 which in turn receives analog signals over a line 130 selectively applied thereto by a multiplexer 132. The multiplexer 132 selects desired analog signals from a plurality of other analog inputs 134, which may be any parameters relating to an engine or vehicle to be diagnosed, along with analog signals on a pair of lines 136, 138 relating specifically to the present invention. The multiplexer 132 may be controlled in response to a timing signal on a line 140 and address signals on a trunk of lines 142, all as is well known in the art. Similarly, synchronism may be had with respect to the A/D converter 128 by means of timing signals on a line 144. The digital processor may be synchronized to the timing of the distributor by means of a sync signal provided by the signal conditioner 30 on the line 32.

Figure 2:
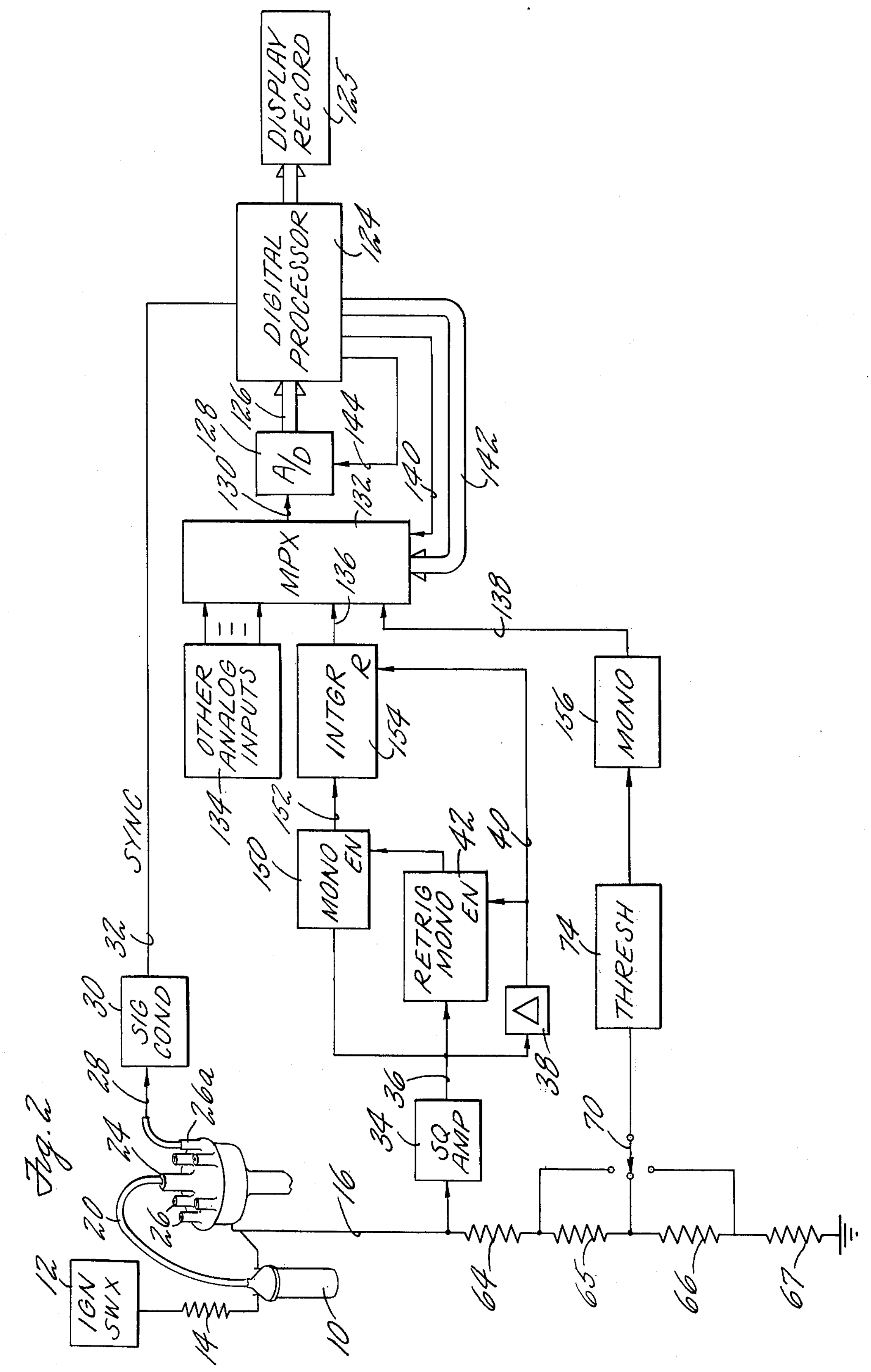
FIG. 2 is a schematic block diagram of another embodiment of the present invention.
Figure 3:
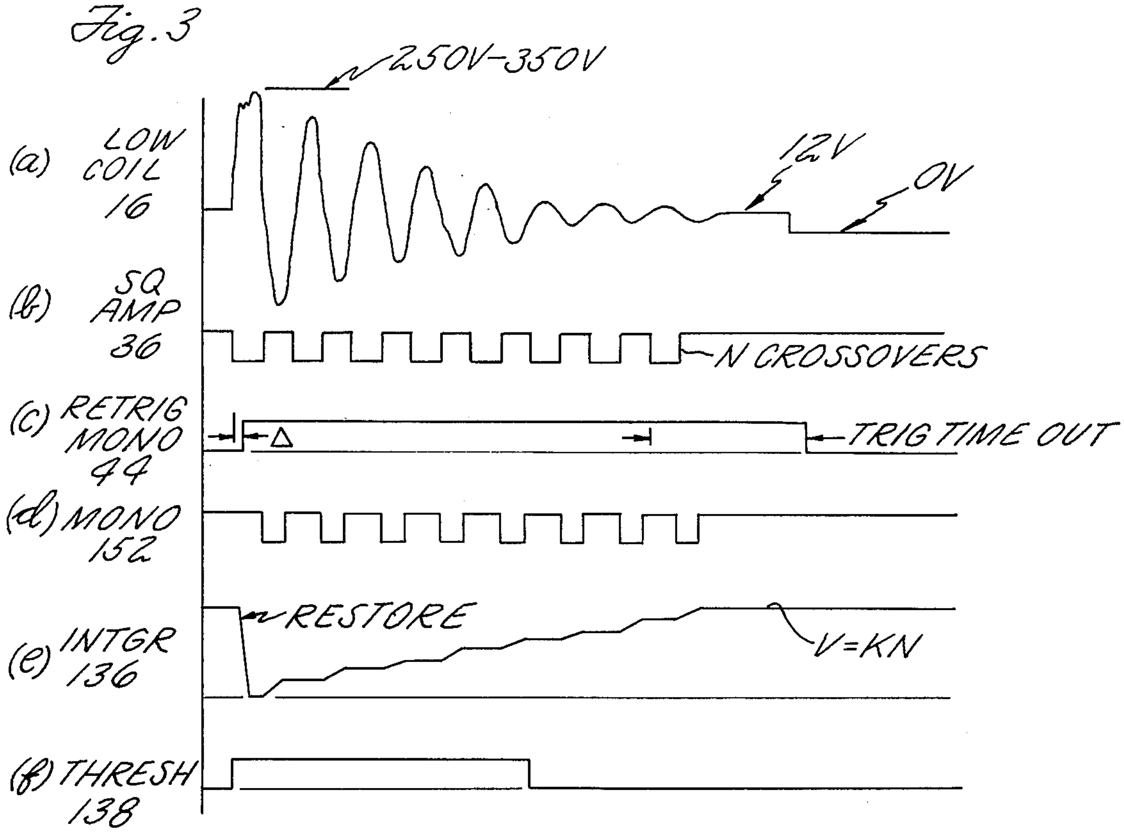
FIG. 3 is a diagram illustrating voltage relationships and timing of the embodiment of FIG. 2.

In FIG. 2, the counting is achieved by quantizing the squared signals on the lines 36 in a monostable multivibrator 150, as is shown in illustration (*d*) of FIG. 3, which provides the quantized signals, one pulse per cross-over, on a line 152 to an integrating circuit 154. The integrating circuit 154 is restored (illustration (*e*) FIG. 3) by the delayed signal on the line 40 once for each revolution of the distributor 18, and after the initial delay (illustration (*c*) FIG. 3), the signal on the line 40 enables the retriggerable monostable multivibrator 42 in the same fashion as described hereinbefore with respect to FIG. 1, so as to enable operation of the monostable multivibrator 150 (which may be of the same type as the multivibrator 42, and in fact may comprise the other half of a well known multivibrator available in integrated circuit form, such as the Ser. No. 74123 referred to hereinbefore).

Similarly, the signal on the line 138 may be provided by a monostable multivibrator 156 in response to operation of the threshold detector 34, if desired, or the threshold detector 74 may be provided in monostable form to present a signal to the multiplexer 132 which is present for a sufficient time to enable the digital processor 124 to sample the signal on the line 138. The signal on the line 138 is a go/no-go indication that the threshold detector has operated, and this may be converted into a digital value for digital analysis, the presence of that value indicating that the threshold detector has operated, and the presence of an all zero or other digital value being indicative of the fact that the threshold detector has not operated. In the embodiment of FIG. 2, no provision is made for sampling over a large number of revolutions of the distributor, but such provisions can be accommodated within the digital processor 24, utilizing well known programming techniques.

The analysis of results as described hereinbefore with respect to FIG. 1 may similarly be provided through programmed processing within the digital processor 124, or, if desired, hard wired logic circuits of the type illustrated in FIG. 1 (or analog processing equivalents thereof) may be used in the embodiment of FIG. 2. In the case of a digital processor 124, it may comprise any well known minicomputer, microcomputer or other multi-function processor, which may be programmed in accordance with well known techniques to achieve results of the type illustrated with respect to FIG. 1, in order to provide analysis of the coil and the capacitor in accordance with the invention.

Similarly, although the invention has been shown and described with respect to preferred embodiments thereof, it should be understood by those skilled in the art that the foregoing and various other changes, omissions and additions therein may be made thereto without departing from the spirit and the scope of the invention.

Having thus described typical embodiments of the invention that which is claimed as new and desired to be secured by Letters Patent of the United States is:

1. Apparatus for testing the ignition coil/capacitor combination of an internal combustion engine comprising:
   circuit means adapted for connection to the low side of the ignition coil to provide a cross-over signal manifestation of the zero cross-overs of the low coil ringing voltage;
   means connected to said circuit means for providing a signal manifestation of the number of zero cross-overs in the low coil ringing voltage; and
   means connected to said circuit means for providing a signal manifestation of the peak voltage of the low coil ringing voltage being above or below a given threshold voltage.

2. Apparatus according to claim 1 wherein said means for providing a signal manifestation of the number of zero cross-overs of low coil ringing voltage comprises a squaring amplifier connected to said circuit means for providing a square wave having transitions concurrent with the zero cross-overs of the low coil ringing voltage.

3. Apparatus according to claim 1 wherein said means for providing a signal manifestation of the number of zero cross-overs of the low coil ringing voltage comprises:
   a retriggerable monostable multivibrator and a delay circuit both connected to said circuit means, the output of said delay circuit being connected to and enabling operation of said retriggerable monostable multivibrator following the period of delay thereof from one of said cross-overs; and
   accumulating means responsive to the on condition of said retriggerable monostable multivibrator and to said circuit means for providing a signal manifestation of the number of cross-overs of the low coil ringing voltage.

4. Apparatus according to claim 3 wherein said accumulating means comprises:
   a second monostable multivibrator responsive to said low coil ringing voltage to provide a pulse of a given duration in response to each pair of zero cross-overs; and
   integration means responsive to the pulses of said second monostable multivibrator for integrating the voltage output thereof over the number of pulses provided thereby, thereby to provide a DC voltage proportional to the number of cross-overs of said low coil ringing voltage.

5. Apparatus according to claim 4 wherein said threshold means comprises:
   a threshold detector;
   and further comprising:
   digital processor means for providing manifestations of the normal or abnormal condition of said coil/-capacitor combination; and
   means including an analog to digital converter responsive to said integration means and to said threshold detector to provide to said digital processor digital manifestations of the number of zero cross-overs of the low coil reinging voltage and of low coil ringing voltage being above or below said given threshold voltage.

6. Apparatus according to claim 3 wherein said accumulating means comprises a gate circuit connected to the output of said retriggerable monostable multivibrator and to said low circuit means to provide a train of pulses, one for each pair of zero cross-overs of the low coil ringing voltage; and
   a digital counter responsive to the output of said gate circuit to advance by one count once for each pair of zero cross-overs of a given direction.

7. Apparatus according to claim 1 wherein said threshold means somprises:
   a threshold detector; and
   a voltage divider connected to a low side of the ignition coil, a tap on said voltage divider being applied to the input of said threshold detector.

8. Apparatus according to claim 7 wherein said voltage divider tap is adjustable to provide the input to said threshold detector at different voltage division ratios.

* * * * *